United States Patent [19]
Knoll et al.

[11] Patent Number: 5,700,876
[45] Date of Patent: Dec. 23, 1997

[54] THERMOPLASTIC MOLDING MATERIAL

[75] Inventors: Konrad Knoll, Mannheim; Hermann Gausepohl, Mutterstadt, both of Germany

[73] Assignee: BASF Aktiengesellschaft, Ludwigshafen, Germany

[21] Appl. No.: 527,496

[22] Filed: Sep. 13, 1995

Related U.S. Application Data

[63] Continuation of Ser. No. 136,950, Oct. 18, 1993, abandoned.

[30] Foreign Application Priority Data

Oct. 24, 1992 [DE] Germany ............... 42 35 978.3

[51] Int. Cl.[6] .................................................. C08F 297/02
[52] U.S. Cl. ........................................ 525/314; 525/316
[58] Field of Search .................................. 525/316, 314

[56] References Cited

U.S. PATENT DOCUMENTS

| | | | |
|---|---|---|---|
| 3,872,068 | 3/1975 | Horiie | 526/209 |
| 4,362,849 | 12/1982 | Tung | 525/316 |
| 4,939,208 | 7/1990 | Lanza et al. | 525/93 |
| 4,956,415 | 9/1990 | Dennis | 525/280 |
| 5,206,302 | 4/1993 | Kohsaka | 525/316 |
| 5,231,142 | 7/1993 | Tsugokura | 525/316 |
| 5,491,193 | 2/1996 | Erikson | 525/65 |

FOREIGN PATENT DOCUMENTS 1206800  9/1970  United Kingdom .

*Primary Examiner*—Irina S. Zemel
*Attorney, Agent, or Firm*—Keil & Weinkauf

[57] ABSTRACT

In a process for preparing a thermoplastic molding material comprising from 80 to 50% by weight of a hard matrix of an anionically polymerized aromatic vinyl compound and from 20 to 50% by weight of a soft phase uniformly distributed in the hard matrix, the percentages being based in each case on the sum of the hard matrix and soft phase, a rubber-elastic block copolymer based on an aromatic vinyl compound and on an alkadiene in a weight ratio of 5:95 to 55:45 is anionically polymerized in a first stage, if desired the living chain ends are capped and the aromatic vinyl compound is polymerized in the presence of the block copolymer with renewed addition of an anionic initiator and while stirring, and the living chain ends are finally (re)closed.

11 Claims, No Drawings

THERMOPLASTIC MOLDING MATERIAL

This application is a continuation of application Ser. No. 08/136,950, filed on Oct. 18, 1993, now abandoned.

The invention relates to a thermoplastic molding material based on a polymer of an aromatic vinyl compound, in particular of styrene, and a rubber polymer dispersed therein, and also to a process for its preparation. The thermoplastic molding material according to the invention may be regarded as an impact-resistant polystyrene having a small residual monomer content.

The following specifications should be referred to regarding the prior art:
(1) GB 1 269 936
(2) U.S. Pat. No. 3,694,535
(3) GB 1 194 440
(4) GB 1 119 261
(5) U.S. Pat. No. 3,536,787
(6) GB 1 213 467
(7) FR 2 050 116

Efforts to reduce the content of residual monomers in styrene polymers are not new. However, all known processes attempt to achieve this object by heating the polymer melt in extruders or in special devolatilizers (see for example GB 1 213 467, GB 1 194 440 or GB 1 119 261). In some cases auxiliaries such as nitrogen and steam are also used in order to enlarge the internal surface area of the melt and thereby increase the devolatilizing effect (GB 1 269 936, U.S. Pat. No. 3,536,787).

The disadvantage of all these processes is that they require high temperatures, which means that a depolymerization-polymerization equilibrium becomes established. The result is that monomer (styrene) or oligomer is constantly being formed.

It is an object of the present invention to provide a process that enables impact-resistant polystyrene to be prepared essentially without residual monomer and which preferably contains less than 1% of compounds from dimers to decamers.

We have found that this object is achieved by a process known per se for preparing polystyrene by anionic polymerization, wherein a rubber-elastic block copolymer is produced in a manner known per se in a first process stage by sequential anionic polymerization of an aromatic vinyl compound and an alkadiene compound in an inert solvent, the living chain ends remaining at the end are either left unchanged or are capped with a stoichiometric amount of a proton-active substance, an aromatic vinyl compound is polymerized in at least one further process stage in the presence of the block copolymer with renewed addition of an anionic initiator and while stirring, and the living chain ends are finally (again) capped by adding a proton-active substance.

By terminating the living chain ends in the first process stage a block copolymer is formed that does not react further.

However, with a suitable choice of the ratio of alkadiene to aromatic vinyl compound the intermediate step of the termination can also be omitted. Although the block copolymer of the first process stage reacts further in the second stage, discrete, dispersely distributed soft component particles are formed in the hard matrix during the phase inversion.

Suitable block copolymers

A suitable rubber-elastic block copolymer may be of the type S-B, S-B-S, B-S-B or S-B-S-B, B denoting alkadiene and S denoting the aromatic vinyl compound. Suitable alkadienes are isoprene, dimethylbutadiene and also in particular butadiene or mixtures thereof.

The molecular weight of the diene block should be from 15,000 to 350,000, preferably from 25,000 to 250,000. The configuration of the block B normally corresponds to that of a medium cis-rubber having a vinyl proportion of from 9 to 12%. However, polymers with higher 1,2-vinyl contents can also be obtained by suitably controlling the polymerization.

Aromatic vinyl compounds for the purposes of the present invention include anionically polymerizable substances of the type of styrene itself and its substitution products, for example α-methylstyrene, vinyltoluene, tert-butylstyrene or ethylstyrene.

These compounds can form the aromatic vinyl block B by themselves or mixed with one another, block molecular weights of from 15,000 to 200,000, preferably from 20,000 to 150,000 being desirable.

The transitions between the blocks may be sharp or tapered.

Polymerization

The molding material according to the invention is obtained in two process steps, namely the preparation of the block rubber and the preparation of the aromatic polyvinyl hard matrix in the presence of the block rubber and using a suitable shear force field, a) Preparation of the block rubber The preparation of the block rubber takes place in a known manner in an inert solvent. A suitable description, to which reference may be made, is given for example in DE 1 301 496.

An essential feature of the invention is that the weight ratio of butadiene to aromatic vinyl compound is adjusted so that a block rubber is provided for the second process stage that not only ensures the disperse distribution of the soft phase in the hard matrix, but also allows the desired type of particle to be formed. The ratios of butadiene to styrene in the block copolymer that result in the desired particle structure are known (Echte; Angew. Makromol. Chem. 58/59, (1977) 175.

The block copolymer, which still has living chain ends, can either be used in this form, ie. as a living polymer, or it can be treated with a stoichiometric amount of a proton-active substance. Water or an alcohol are preferably used.

The solids content of the first stage should not exceed 50%. Solids contents from 15 to 35% are preferred.

b) Preparation of the hard matrix

According to the invention, in order to obtain a thermoplastic molding material an organometallic initiator is added to the polymer solution and the desired aromatic vinyl compound is run in while stirring.

Suitable initiators include the known monolithium hydrocarbons of the formula R-Li, R being an aliphatic, cycloaliphatic, aromatic or mixed aliphatic-aromatic hydrocarbon radical. Preferably monolithium alkyl compounds with 2 to 6 carbon atoms in the alkyl group are used, n-butyllithium or sec-butyllithium being particularly preferred.

The aromatic vinyl compound can be run in at such a rate that the heat of polymerization can be efficiently removed by evaporative cooling or external cooling and a temperature of from 40° to 150° C., preferably from 60° to 80° C. can be maintained.

Depending on whether a living or a capped block rubber is used, its structure will either change due to the formation of a further aromatic polyvinyl block, or such a change will not occur. Nevertheless, in both cases a graft reaction should take place. The invention is however not dependent on this phenomenon.

During the course of the reaction of the aromatic vinyl compound a phase inversion occurs in each case, as with the known free-radical polymerization, the initially coherent block rubber phase becoming distributed in a disperse manner in the hard matrix phase.

The processes taking place in this phase inversion are known and have been described, for example, by Echte et al., Angew. Chem. 93, (1981) 372–388.

The polymerizing mixture must be stirred in this state so that rubber particles of specific structure and size form, as mentioned by Echte et al., loc. cit.

After the phase inversion stirring must be continued, ie. the mean particle size desired in each case must be reached and stabilized by suitable shear conditions. These shear conditions depend, inter alia, on the reactor size, degree of filling, solution viscosity and the type of stirring equipment. The shear conditions can be determined by the person skilled in the art on the basis of a few tests. Further information on this matter is given by Freeguard in J. Appl. Polym. Sci 15,(1971) 1649.

The molecular weight of the aromatic vinyl compound forming the hard matrix can be specified before-hand in each anionic polymerization by the ratio of initiator to monomer, and is preferably from 150,000 to 350,000.

Removal of the solvent

At the end of the polymerization the mixture is worked up in the usual way, for example by treatment in a devolatilizing extruder, where the solvent is removed for example at from 120° to 260° C. and under a reduced pressure of from 2 to 80 mbar.

Thermoplastic molding materials according to the invention may contain conventional auxiliaries such as stabilizers, lubricants, antistatics or UV-protectants.

EXAMPLE 1

Step 1:

A 10 liter capacity metal vessel equipped with an anchor stirrer was cleaned by boiling out with a solution of n-butyllithium-1,1-diphenylethylene (10:1) in cyclohexane under nitrogen, and filled with 2304 ml of ethylbenzene. 63.7 ml of unstabilized styrene were added, followed by 0.11 molar sec-butyllithium at 30° C. until the solution started to turn yellow. 8 ml of 0.11M sec-butyllithium were added at 37° C. and the mixture was polymerized for 30 minutes at a maximum of 65° C. ($\overline{M}_n$=57,000), and 250 ml of butadiene were then polymerized at the same temperature within 50 minutes. The yellow solution was titrated against 1M isopropanol solution in cyclohexane until the solution was no longer yellow (0.9 ml). Molecular weight of the block copolymer compared to polystyrene standard (GPC): 350,000.

Step 2:

107.9 ml of 0.11M sec-butyllithium were added, followed by 1958 ml of styrene at from 60° to 65° C. within 25 minutes; the reaction mixture was post-polymerized for 30 minutes and terminated with 2 ml of isopropanol. (GPC: peak maximum at 150,000). The solution was stabilized with 2 g of Irganox 1076 and 40 g of white oil were added.

The milky-white solution was devolatilized in an extruder at 200° C. under 20 mbar and compounded. The residual content of styrene was measured by gas chromatography and found to be 4 ppm.

EXAMPLE 2

The same procedure as in Example 1 was adopted, first of all butadiene and then styrene being polymerized. The product was identical to that of Example 1. The residual monomer content was 5 ppm.

EXAMPLE 3

The same procedure as in Example 2 was adopted, except that no isopropanol was added after step 1 to neutralize the living ends of the block copoloymer. GPC gave a peak maximum of 500,000 (13% with respect to UV detection) and 15,000 (87% with respect to UV). The residual styrene content was found to be 4 ppm.

We claim:

1. A process for preparing a thermoplastic molding material made up of from 80 to 50% by weight of a hard matrix of an anionically polymerized aromatic vinyl compound and from 20 to 50% by weight of a soft phase distributed in the hard matrix, said material having a reduced content of residual monomers, which process comprises: anionically polymerizing an aromatic vinyl compound and an alkadiene in a weight ratio of 5:95 to 55:45 in an inert solvent for the aromatic vinyl compound to form a rubber-elastic block copolymer in a first stage, polymerizing additional aromatic vinyl compound with stirring and with renewed addition of anionic initiator in the presence of the block copolymer produced in the first stage to form the thermoplastic molding material, and thereafter capping the living chain ends of the molding material.

2. A molding material obtained by the process of claim 1.

3. A molding material obtained by the process of claim 1, wherein the portion of dimers up to and including decamers is less than 1%.

4. A molding material as claimed in claim 2, comprising styrene as aromatic vinyl compound and butadiene as alkadiene.

5. A molding material as claimed in claim 2, comprising as aromatic vinyl compound vinyltoluene, tertbutylstyrene, α-methylstyrene by themselves or mixed with styrene or mixed with one another.

6. A molding material as claimed in claim 2, comprising as alkadiene isoprene or dimethylbutadiene, by themselves or mixed with butadiene or mixed with one another.

7. A molding material as claimed in claim 2, comprising a block copolymer that is of the type S-B, S-B-S, B-S-B, S-B-S-B and has sharp or tapered transitions between the blocks, B denoting the polymeric alkadiene and S the polymeric aromatic vinyl compound.

8. A molding material as defined in claim 2, wherein the block copolymer is built up in a star-shaped manner.

9. A molding material as defined in claim 3, wherein the block copolymer is built up in a star-shaped manner.

10. A molding material as defined in claim 5, wherein the block copolymer is built up in a star-shaped manner.

11. A molding material as defined in claim 6, wherein the block copolymer is built up in a star-shaped manner.

* * * * *